United States Patent
Gilgen et al.

(10) Patent No.: US 7,548,974 B2
(45) Date of Patent: Jun. 16, 2009

(54) ADAPTIVELY PROCESSING CLIENT REQUESTS TO A NETWORK SERVER

(75) Inventors: David B Gilgen, Raleigh, NC (US); Anthony R Tuel, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 829 days.

(21) Appl. No.: 10/963,386

(22) Filed: Oct. 12, 2004

(65) Prior Publication Data

US 2006/0095571 A1    May 4, 2006

(51) Int. Cl.
    *G06F 15/173* (2006.01)
(52) U.S. Cl. .................. 709/225; 709/223; 709/203; 709/200; 718/101; 718/102; 718/103; 370/249
(58) Field of Classification Search .......... 709/200, 709/203, 225, 223; 370/249; 718/101, 102, 718/103
    See application file for complete search history.

(56) References Cited

U.S. PATENT DOCUMENTS

| | | | |
|---|---|---|---|
| 5,560,029 A | | 9/1996 | Papadopoulos |
| 5,608,720 A * | | 3/1997 | Biegel et al. ........... 370/249 |
| 6,640,245 B1 | | 10/2003 | Shen et al. |
| 6,687,735 B1 * | | 2/2004 | Logston et al. ........... 709/203 |
| 6,779,180 B1 | | 8/2004 | Palm |
| 2004/0015543 A1 | | 1/2004 | Schmidt et al. |
| 2006/0101111 A1 * | | 5/2006 | Bouse et al. ........... 709/200 |

FOREIGN PATENT DOCUMENTS

EP    1122737 A1    8/2001

OTHER PUBLICATIONS

Ungerer (2003) ACM Computing Surveys 35:29.

* cited by examiner

*Primary Examiner*—Ario Etienne
*Assistant Examiner*—Uzma Alam
(74) *Attorney, Agent, or Firm*—Bruce Clay; Rudolf O. Siegesmund; Gordon & Rees LLP

(57) ABSTRACT

In a computer network environment, a server protocol is provided to process read requests from clients. Rather than all read requests being processed synchronously or all read requests being processed asynchronously, an attempt is first made to perform a synchronous read. If the synchronous read is unsuccessful, the connection through which the request was received by the server is registered with a monitoring service. When the data is ready to be read, an appropriate callback is called and the data transmitted. An optional delay may be imposed before the synchronous read is attempted to increase the likelihood that the attempt will be successful. A series of delays/read attempts may also be employed in order to increase the likelihood still further that an attempt will be successful.

7 Claims, 4 Drawing Sheets

ADAPTIVELY PROCESSING CLIENT REQUESTS TO A NETWORK SERVER

TECHNICAL FIELD

The present invention relates generally to computer network environments and, in particular, to optimizing the processing of client requests to a network server.

BACKGROUND ART

In a computer network environment, a server may process data requests from hundreds or thousands of clients. For example, a web server may receive a request for data which, when received by the requesting client, allows the client to view a web page. The server places the request into a thread (or multiple threads) previously allocated by the server. The thread provides instructions for the flow of work required to obtain the requested data and return it to the client. Typically, the server reads the request from the server's network connection with the client in one of three ways. The read may be a "synchronous blocking read" in which the thread is blocked while waiting for the retrieval of the requested data and must complete before being released to another request. Because no thread switching is involved, synchronous blocking reads may be fast. However, because no other process may use the thread while the thread is waiting to complete, the number of network connections which may be processed at a time is limited to the number of threads allocated.

Alternatively, the read may be a "synchronous non-blocking read" in which the thread periodically attempts to read the data from the connection. Between attempts, the thread is not blocked and may perform other tasks. While efficiency may be improved relative to a synchronous blocking read, scalability (the number of network connections which may be processed at a time) remains limited.

In the third possible method, the read is an "asynchronous non-blocking read" in which the network connection is registered with a service to monitor the connection. When the requested data is ready to be read, the monitoring service calls a callback on another thread to allow the requesting client to retrieve the data. Although scalability is improved from synchronous reads, the required thread switching for every request may adversely affect performance.

Typically, another read request from the client follows data sent in response to a previous request. However, the subsequent request may follow immediately, such as when multiple requests are sent for pieces of a web page, or may follow after a considerable delay, such as when the client's user is thinking about what web page to go to next. Thus, a blocking read may be the most efficient for the former situation but a non-blocking read may be the most efficient for the latter situation.

Consequently, a need remains for improved processing of read requests from a client to a server.

SUMMARY OF THE INVENTION

The present invention provides a server protocol to process read requests from clients. Rather than all read requests being processed synchronously or all read requests being processed asynchronously, an attempt is first made to perform a synchronous read. If the synchronous read is unsuccessful, the connection through which the request was received by the server is registered with a monitoring service. When the data is ready to be read, an appropriate callback is called and the data transmitted.

An optional delay may be imposed before the synchronous read is attempted to increase the likelihood that the attempt will be successful. A series of delays/read attempts may also be employed in order to increase the likelihood still further that an attempt will be successful. The delays may be of the same length of time or may be different. In one aspect of the present invention, a first delay is set to approximate the expected time required for a successful synchronous read request to be completed. A second delay is set to a different, shorter time. The first delay may be determined by logging the average delay while processing a previous request and adaptively adjusting the first delay.

The risk of stack overflows may also be reduced by forcing the stack to unwind if more than a predetermined number of synchronous reads are successful.

DETAILED DESCRIPTION OF THE PREFERRED EMBODIMENT

Figure 1:
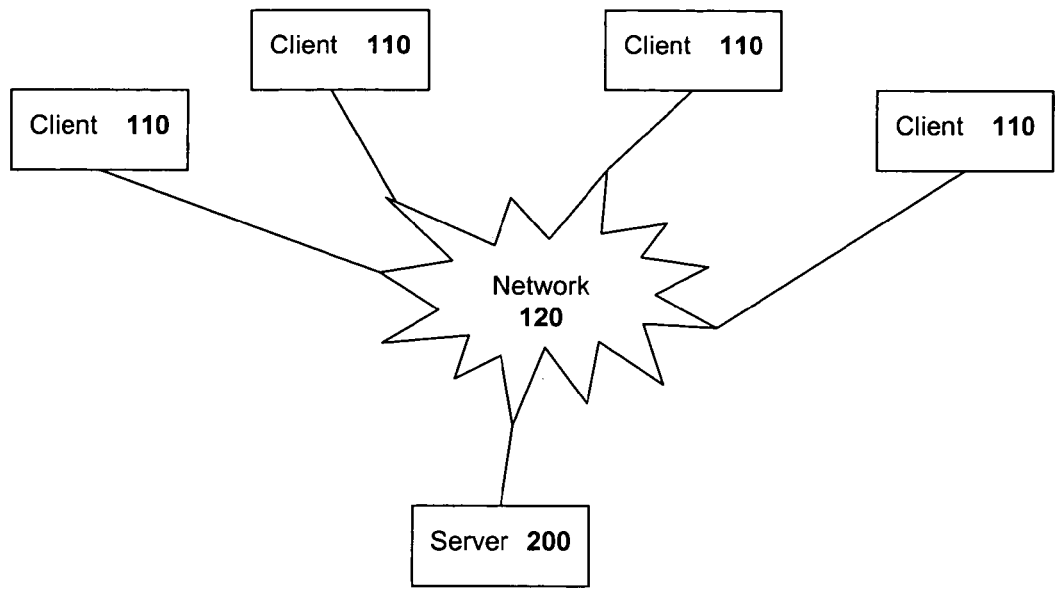
FIG. 1 is a block diagram of a network environment in which the present invention may be implemented.
Figure 2:
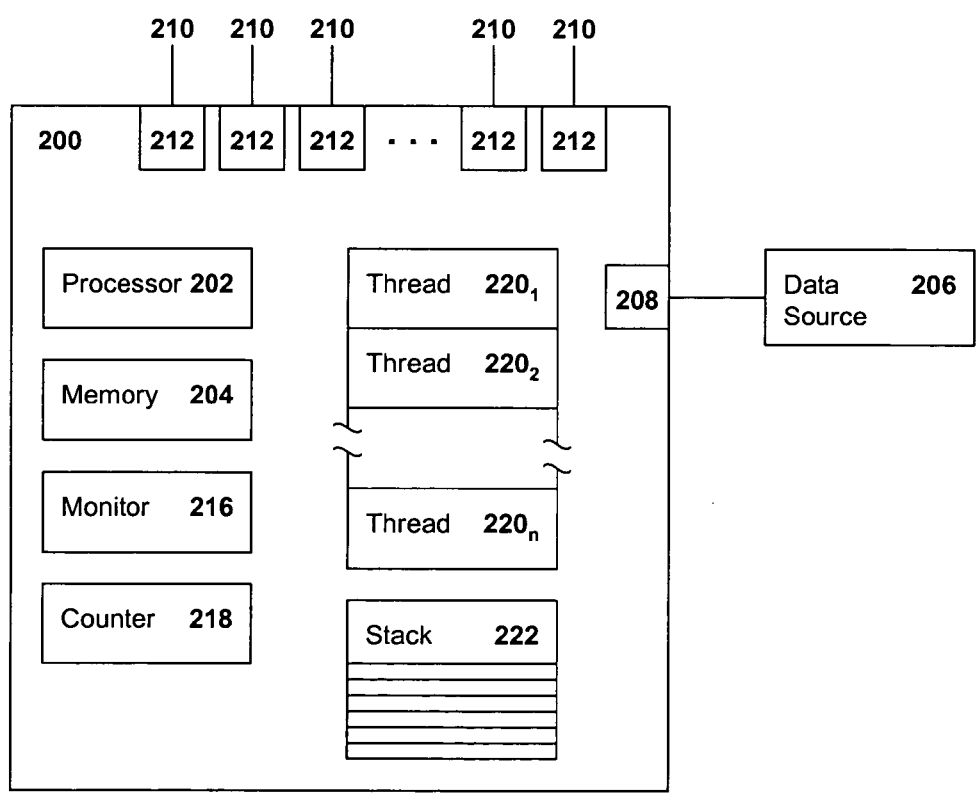
FIG. 2 is a block diagram of a server adapted to implement the present invention.

FIG. 1 is a block diagram of a network environment 100 in which the present invention may be implemented. The environment 100 includes numerous client units 110 and a server 200, interconnected through a network 120. As illustrated in FIG. 2, the server 200 includes a processor 202 and a memory 204 for, among other functions, storing instructions executable by the processor 202. The server 200 is connected to a data source 206, such as a data storage drive, through an interface 208. Connections 210 to network clients 110 are made through interfaces 212. Threads $220_1$-$220_n$ are allocated, such as out of the memory 204 and used to direct the sequential flow of work, such as processing read requests. As will be described below, the server 200 further includes a service monitor 216 to monitor asynchronous reads, a stack (generally a dedicated portion of the memory 204) and, optionally, an iteration counter 218.

Figure 3:
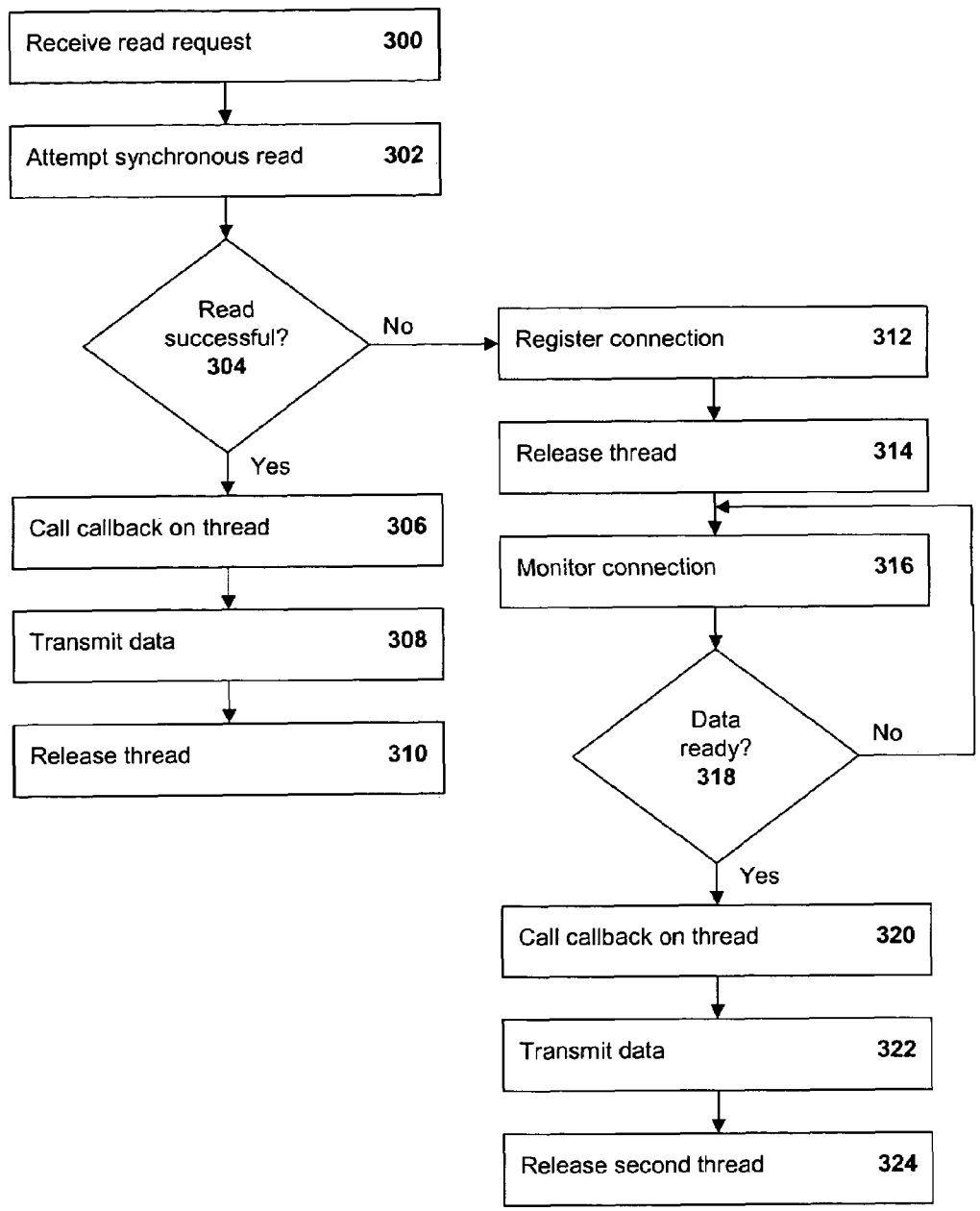
FIG. 3 is a flow chart of one aspect of the present invention in which a synchronous attempt to read data is followed by an asynchronous read.

Referring to FIG. 3, a method of the present invention will be described. After a request is received by the server 200 from a client over a connection 210 (step 300), a thread is created and an attempt is made to read the requested data in a non-blocking, synchronous manner (step 302). If the read attempt is successful (step 304), the server calls a callback on the same thread (step 306). After the server transmits the data to the client (step 308), the thread is released for subsequent re-use (step 310).

If, on the other hand, the synchronous read attempt is unsuccessful (step 304), the connection over which the request was received is registered with the monitoring service 216 (step 312) and the thread is released (step 314). The monitoring service 216 monitors the connection (step 316) and, when the data is ready (step 318), the server calls a callback on a different thread (step 320). After the server transmits the data to the client (step 322), the thread is released for subsequent re-use (step 324). Thus, a synchronous read is employed initially and an asynchronous read is automatically employed if the synchronous read fails.

Figure 4:
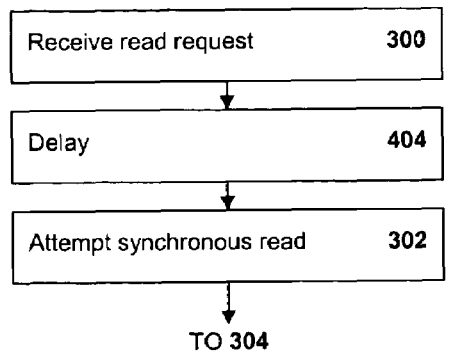
FIG. 4 is a flow chart of another aspect of the present invention in which a delay is imposed before the synchronous read of FIG. 3 is attempted.

Frequently, data is not available immediately after a response to a request has been sent due to network delays as well as the time required by the client to process a response and send the next request. Thus, the attempted synchronous read (step 302) will frequently, but unnecessarily, fail, sending the process into the asynchronous mode (beginning with step 312) and reducing the performance of the server. As illustrated in FIG. 4, one embodiment of the present invention addresses the inefficiency by introducing a predetermined delay before the synchronous read is attempted. After the read request is received by the server 200 (step 400), the server waits for the predetermined delay period, such as 50 milliseconds (step 404). The synchronous read attempt is then made (step 302) and the process continues (at step 304) as illustrated in the balance of FIG. 3. Thus, the imposed delay accommodates network and other delays and increases the likelihood of a successful synchronous read. However, if the total chosen is too long, the thread may be tied up for an unnecessarily long time. And, if the total chosen is too short, the likelihood of a successful synchronous read may decrease.

Figure 5:
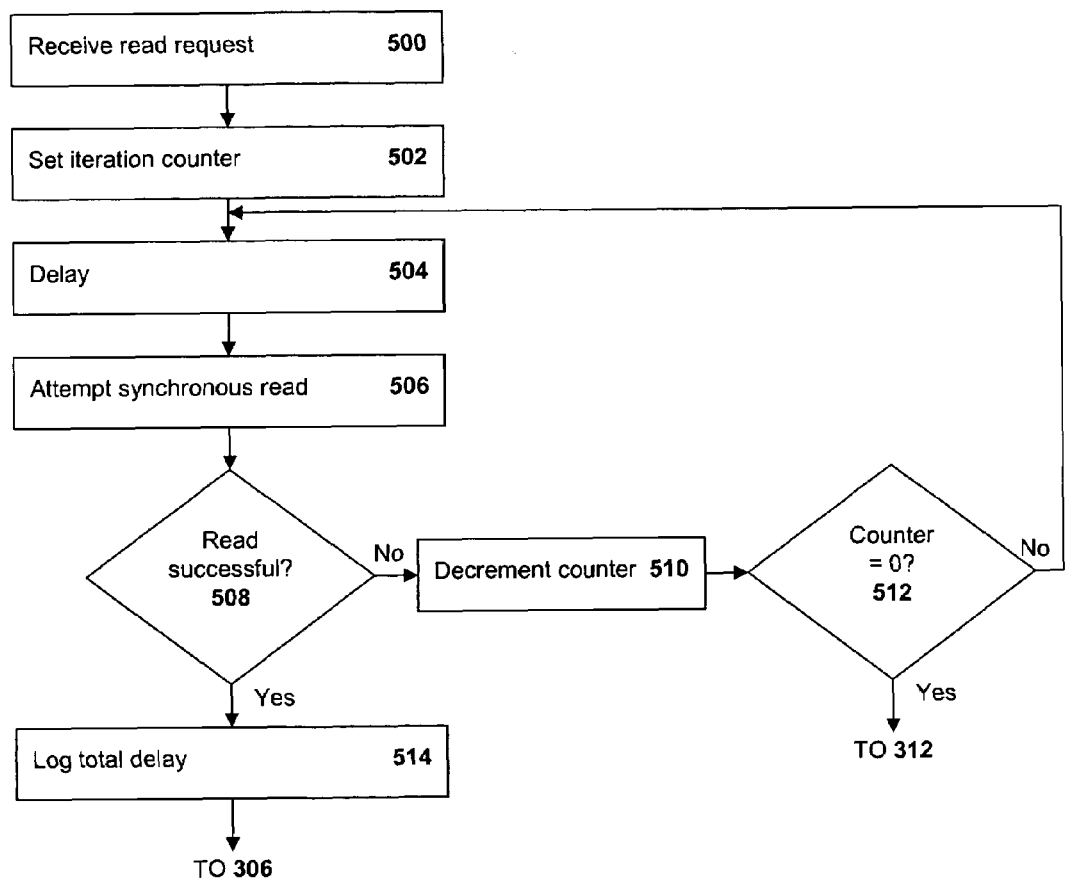
FIG. 5 is a flow chart of a further aspect of the present invention in which the delay/read attempt sequence of FIG. 4 is performed up to a predetermined number of times.

The embodiment of FIG. 5 introduces flexibility into the delay to increase the likelihood of a successful read without tying up the thread for an unduly long period. In this embodiment, after the read request is received by the server 200 (step 500), the iteration counter 218 is set to a value, such as five (step 502), and the server waits for a predetermined delay period, such as 10 milliseconds (step 504). The synchronous read attempt is then made (step 506). If the attempt is unsuccessful (step 508), the counter is decremented (step 510); if the counter has not yet reached zero (step 512), the process loops back and waits again for the delay period (step 504) before making another attempt to read the data (step 506). The process continues until the read is successful, in which case the callback is called (step 306, FIG. 3), or until the counter 218 reaches zero. If the counter 218 reaches zero, the connection is registered with the service monitor 216 (step 312, FIG. 3) to initiate the asynchronous read process. Thus, the imposed delay accommodates network and other delays and increases the likelihood of a successful synchronous read. The total delay time is based upon the length of each individual delay selected and the number of iterations selected. It will be appreciated that the scope of the present invention does not depend upon the choice of the counter 218. The counter 218 may thus be the described count-down counter, a count-up counter, which is incremented until it reaches a predetermined value, or any other kind of counter. Alternatively, a timer may be employed which runs (up or down) for the total predetermined delay period in which case the step 502 of setting and starting the counter would be replaced with a comparable step of setting the timer and the step 510 of decrementing the counter would be eliminated.

Figure 6:
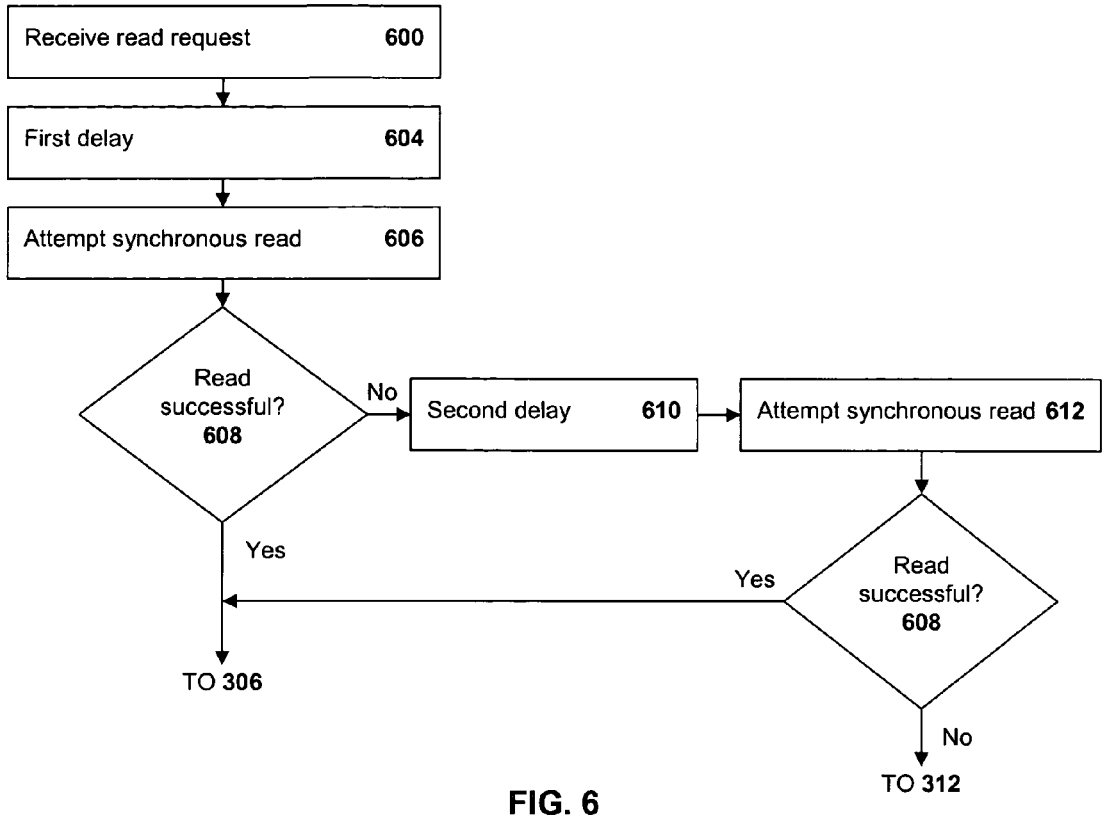
FIG. 6 is a flow chart of a further aspect of the present invention in which the delay/read attempt sequence of FIG. 4 is performed twice.

The embodiment of FIG. 5 may be refined further, as illustrated in FIG. 6. After the request has been received (step 600), the process pauses for a first delay (step 604) before the synchronous read is attempted (606). If the read is successful (step 608), the callback is called as in the other embodiments (step 306, FIG. 3). Otherwise, a second delay is encountered (step 610) after which a second synchronous read attempt is made (step 612). If this attempt is successful (step 614), the callback is called (step 306, FIG. 3). If not, the connection is registered as in the other embodiments (step 312, FIG. 3). The first delay period may be manually selected to be a period, such as 40 milliseconds, which is the approximate average of the total delay required process other requests over the connection. The second delay may be a shorter delay, such as 10 milliseconds, to provide one more opportunity for the synchronous read before resorting to the asynchronous read.

Referring again to FIG. 5, if the synchronous read is successful during any of the iterations, the total delay period may be logged (step 514) and later imposed as the first delay during subsequent requests. Preferably, the server 200 will process a first request over a connection in the manner described with respect to FIGS. 3 and 5, recording the total delay required for a successful read. The server 200 then switches to the process described with respect to FIGS. 3 and 6. Before processing subsequent requests, the server 200 adaptively adjusts the first delay (step 604) to be approximately the same as the total delay recorded while the first request was processed. For example, if the first request was successful after 4 iterations of 10 milliseconds each, the first delay period would be automatically set to 40 milliseconds. The second delay may be set to, for example, 10 milliseconds, thereby providing a potential of 50 milliseconds for two synchronous read attempts before the connection is registered for an asynchronous read.

When a read request is received and placed in a thread, a return address as well as information about the state of the system are added to the top of the stack 222. If an attempt at a synchronous read is successful, the callback typically processes the request, sends the response and tries to read the next request, all without "popping" the previously added information from the stack 222. The next request may also result in a successful synchronous read and a callback called on the same thread, also without popping the new information off of the stack 222. If this sequence is repeated too often, the stack 222 may not be able to unwind, resulting in an overflow situation and possible loss of data and/or system crash. Stack operations are described in more detail in commonly-assigned U.S. Pat. No. 6,779,180, entitled "Apparatus and Method for Preventing Stack Overflow from Synchronous Completion of asynchronous Functions", which patent is incorporated herein by reference in its entirety.

Figure 7:
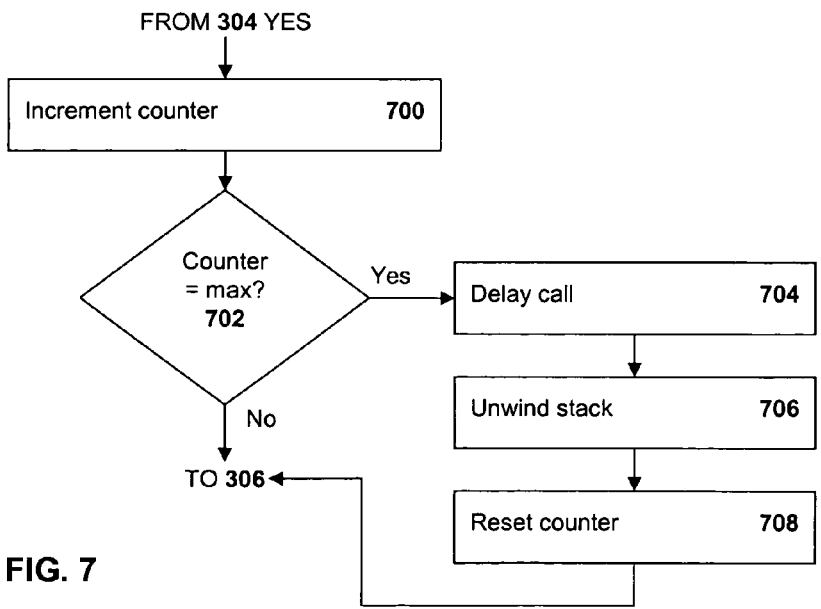
FIG. 7 is a flow chart of a further aspect of the present invention in which the stack is unwound to prevent an overflow.

The risk of a stack overflow may be reduced in the present invention by implementing an optional stack "unwinding" subroutine as illustrated in the flow chart of FIG. 7. When a synchronous read attempt is successful (step 304) and a callback is to be called on the current thread, a counter is incremented (step 700). If the counter has reached a predetermined value (step 702), indicating that the stack depth has reached a maximum safe level, an indicator in the thread may be set to delay the call to the callback (step 704). The stack 222 is then unwound (step 706) and the callback called (step 306, FIG. 3). Alternatively, rather than calling the callback, the request may be registered immediately with the monitoring service 216, triggering the unwinding of the stack 222. The counter is then reset (708) and the next read request will proceed with a fresh stack.

The objects of the invention have been fully realized through the embodiments disclosed herein. Those skilled in the art will appreciate that the various aspects of the invention may be achieved through different embodiments without departing from the essential function of the invention. The particular embodiments are illustrative and not meant to limit the scope of the invention as set forth in the following claims.

What is claimed is:

1. A method of processing requests in a network environment, comprising:
    attempting a first synchronous read on a first thread on which a first request for data is received from a network connection;
    calling a callback on the first thread if the first synchronous read succeeds;
    registering the connection with a monitoring service if the first synchronous read fails;
    monitoring the registered connection; and
    calling a callback on a second thread when the data is ready to be read.

2. The method of claim 1, further comprising attempting the first synchronous read following a delay of a first predetermined period.

3. The method of claim 2, further comprising, if the attempt to perform the first synchronous read is unsuccessful, repeatedly attempting the first synchronous read, with each attempt following a delay of the first predetermined period.

4. The method of claim 3, further comprising, if one of the repeated attempts to perform the first synchronous read is successful:
    recording the total delay required to perform the first synchronous read of the data;
    setting a second predetermined period to equal the total delay;
    following a receipt of a second request for data from the network connection and a delay of the second period, attempting a second synchronous read on a second thread; and
    if the attempt to perform the second synchronous read is unsuccessful, attempting the second synchronous read following a delay of the first predetermined period.

5. The method of claim 3, further comprising, if none of the repeated attempts to perform the first synchronous read is successful:
    upon receipt of a second request for data from the network connection, registering the connection with the monitoring service without attempting to perform a synchronous read of the data;
    monitoring the registered connection; and
    calling a callback on a second thread when the data is ready to be read.

6. The method of claim 1, further comprising:
    incrementing a counter before calling the callback on the second thread;
    unwinding a stack and resetting the counter if the counter reaches a predetermined value; and
    calling the callback.

7. The method of claim 1, further comprising:
    incrementing a counter before calling the callback on the second thread; and
    if the counter reaches a predetermined value:
        registering the connection with the monitoring service;
        unwinding a stack and resetting the counter;
        monitoring the registered connection; and
        calling a callback when the data is ready to be read.

* * * * *